United States Patent [19]
Jahnke et al.

[11] Patent Number: 5,345,756
[45] Date of Patent: Sep. 13, 1994

[54] PARTIAL OXIDATION PROCESS WITH PRODUCTION OF POWER

[75] Inventors: Frederick C. Jahnke, Rye, N.Y.; Paul S. Wallace, Katy; Pradeep S. Thacker, Houston, both of Tex.

[73] Assignee: Texaco Inc., White Plains, N.Y.

[21] Appl. No.: 139,367

[22] Filed: Oct. 20, 1993

[51] Int. Cl.$^5$ .................................................. F02G 3/00
[52] U.S. Cl. ................................. 60/39.02; 60/39.12; 48/197 R; 252/373
[58] Field of Search ................ 60/39.02, 39.05, 39.12; 48/197 R, 197 A, 206, 209, 215; 252/373; 423/418.2, 650

[56] References Cited

U.S. PATENT DOCUMENTS

| | | | |
|---|---|---|---|
| 4,121,914 | 10/1978 | Barber et al. | 60/39.02 |
| 4,132,065 | 1/1979 | McGann | 60/39.12 |
| 4,756,722 | 7/1988 | Knop et al. | 60/39.12 |

*Primary Examiner*—Richard A. Bertsch
*Assistant Examiner*—William J. Wicker
*Attorney, Agent, or Firm*—Goerge J. Darsa

[57] ABSTRACT

A highly efficient partial oxidation process with the production of power comprising the steps of producing fuel gas by the partial oxidation of hydrocarbonaceous fuel, cooling said fuel gas at high pressure by quenching in water to produce quenched fuel gas and by indirect heat exchange with BFW to maximize the production of IP and MP steam, cleaning said fuel gas, preheating scrubbing water comprising process condensate and make-up water by direct contact and direct heat exchange with clean fuel gas and using said preheated scrubbing water in the cleaning of said fuel gas, reducing the pressure of said cooled fuel gas stream prior to heating water for fuel gas saturation, cooling the process fuel gas stream in stages and condensing water for use as said scrubbing water, purifying the process fuel gas and saturating it with water, and burning said purified and saturated fuel gas in the combustor of a power-producing gas turbine along with saturated nitrogen to produce exhaust gas with a reduced $NO_x$. In one embodiment, the hot exhaust gas from the gas turbine is passed through a HRSG to superheat the process steam. The superheated process steam is then used as part of the working fluid in an expansion turbine for the production of power. Steam condensate may be converted into high pressure (HP) steam and superheated in the HRSG. The power generation steam cycle is optimized to assist in maximizing the process steam which can be used most efficiently in the cycle.

19 Claims, 1 Drawing Sheet

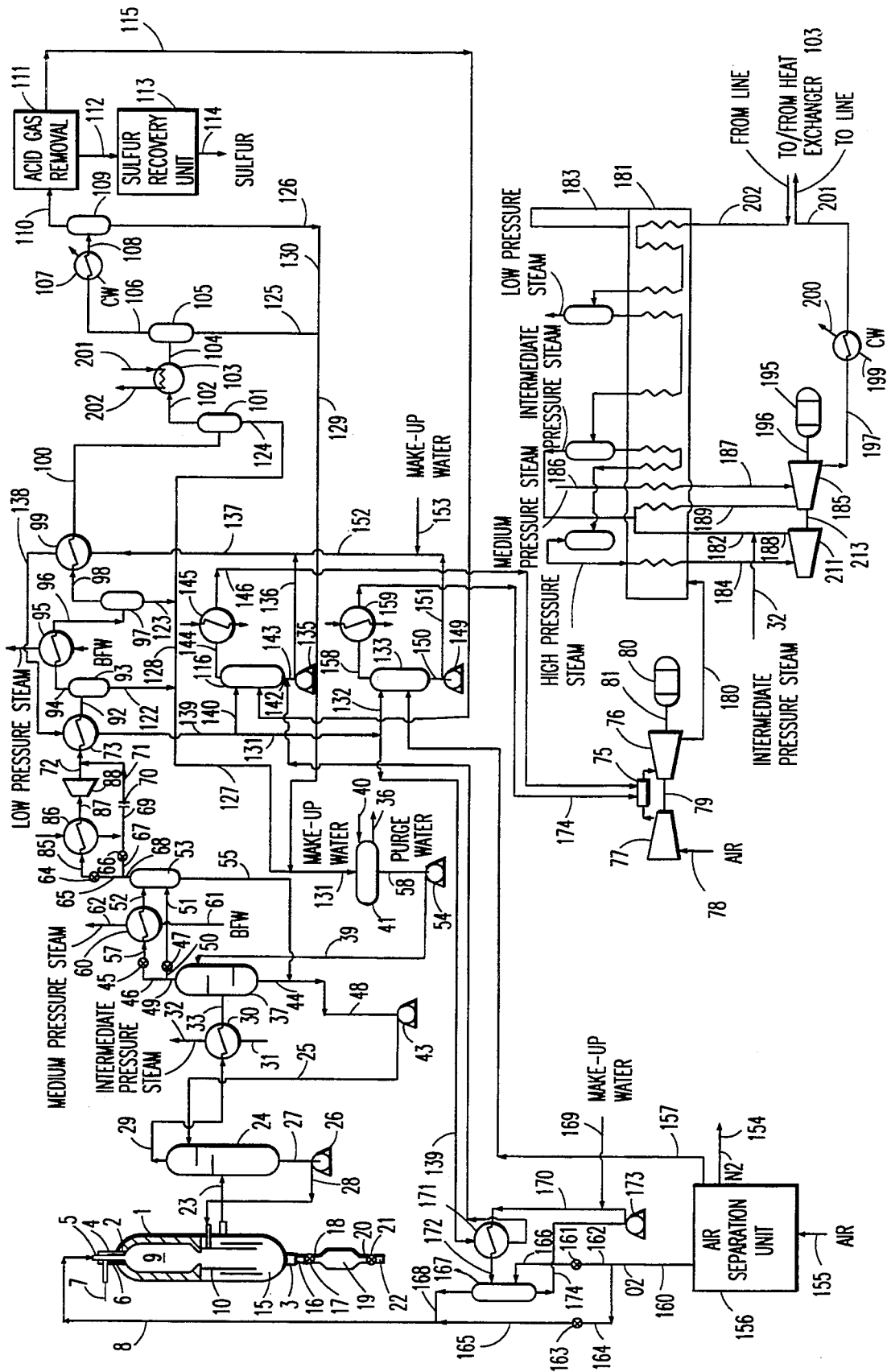

PARTIAL OXIDATION PROCESS WITH PRODUCTION OF POWER

BACKGROUND OF THE INVENTION

1. Field of the Invention

This invention relates to the production of fuel gas by the partial oxidation of hydrocarbonaceous fuels and the burning of said fuel gas in a gas turbine for the production of power.

The production of fuel gas by the partial oxidation of liquid hydrocarbon fuel; controlling the mole ratio ($CO/H_2$) of the fuel gas by reverse water-gas shifting; cleaning and purifying the fuel gas; and burning the improved stream of fuel gas in a power-developing gas turbine is disclosed in coassigned U.S. Pat. No. 3,868,817. Heating water for use in saturating fuel gas was done by noncontact indirect heat exchange in U.S. Pat. No. 5,117,623. However, neither one of these processes teaches applicants' highly efficient integrated gasification process which includes the steps of (1) cooling the quenched saturated stream of raw fuel gas to below the dew point to condense out water for use in quenching and scrubbing the raw fuel gas, and maximizing the scrubbing water temperature by direct contact of the scrubbing water with the quenched raw fuel gas stream just downstream of a heat exchanger for the production of intermediate pressure steam which is superheated and introduced into an expansion turbine as at least a portion of the working fluid; and, (2) locating the line pressure reducing means prior to heating water for saturation of fuel gas and nitrogen gas and before the full cooling of the raw stream of unpurified fuel gas so as to benefit from the substantial amount of water remaining in the raw fuel gas at this point of the process which provides for heating condensate for scrubbing the raw fuel gas.

SUMMARY

A preferred embodiment of the subject partial oxidation process pertains to a highly efficient integrated gasification combined cycle (IGCC) process which incorporates gas cooling in stages and which operates at high pressure to allow maximum heat from the quenched fuel gas to be used in power generation. The power generation steam cycle is optimized to assist in maximizing the process steam which can be used most efficiently in the cycle. Nitrogen from a gasification air separation unit and the fuel gas are saturated and used to enhance the efficiency and to assist in minimizing $NO_x$ production.

The process consists essentially of the following steps:

(1) reacting a hydrocarbonaceous fuel by partial oxidation to produce a stream of fuel gas, cooling said fuel gas by quenching in water to produce a stream of quenched saturated fuel gas having a temperature in the range of about 350° F. to 600° F., such as about 450° F. to 550° F., and a pressure in the range of about 500 to 2500 psia, such as about 700 to 1500 psia, cooling said quenched saturated fuel gas by indirect heat exchange with boiler feed water thereby reducing the temperature of said quenched fuel gas to a temperature in the range of about 410° F. to 550° F., such as about 420° F. to 470° F. while simultaneously converting said boiler feed water to steam having an intermediate pressure in the range of about 275 to 600 psia, such as about 300 to 400 psia, and cleaning said quenched saturated fuel gas with preheated scrubbing water from (2);

(2) preheating scrubbing water comprising process condensate and make-up water to a temperature in the range of about 375° F. to 550° F. such as about 400° F. to 450° F. by direct heat exchange in a gas-water direct contacting means with cooled quenched saturated fuel gas leaving (1) thereby reducing the temperature of said cooled quenched saturated fuel gas to a temperature in the range of about 300° F. to 540° F., such as about 400° F. to 450° F., and separating condensed water from said cooled fuel gas;

(3) reducing the pressure of said cooled fuel gas from (2) in the amount of about 100 to 2300 psia, such as about 200 to 1200 psia, further cooling said fuel gas to a temperature in the range of about 40° F. to 140° F., such as about 100° F. to 120° F., by indirect heat exchange with cool water thereby condensing out water from said cooled fuel gas stream while heating said cool water to produce heated water having a temperature in the range of about 225° F. to 400° F., such as about 275° F. to 370° F., and introducing the water condensed out in (2) and (3) into said gas-water direct contacting means in (2) when it is heated for use as gas scrubbing water;

(4) purifying the cooled fuel gas stream from (3);

(5) saturating a stream of nitrogen gas and the stream of purified fuel gas from (4) with said heated water from (3);

(6) superheating the saturated streams of fuel gas and nitrogen gas from (5) to a temperature in the range of about 350° F. to 1000° F., such as about 500° F. to 600° F.; and introducing said superheated fuel gas and nitrogen gas streams into the combustor of a gas turbine;

(7) burning said saturated fuel gas in said combustor at a temperature in the range of about 2200° F. to 2600° F. and a pressure in the range of about 100 to 1000 psia, such as about 150 to 500 psia, in a gas turbine to produce an exhaust gas with a reduced amount of $NO_x$; and (8) passing said exhaust gas through an expansion turbine for the production of power with an increased output.

In one embodiment, the thermal energy in the turbine exhaust gas is utilized to make steam. The steam is then used as the working fluid in a steam turbine, thereby increasing the thermal efficiency of the process.

BRIEF DESCRIPTION OF THE DRAWING

A more complete understanding of the invention may be had by reference to the accompanying drawing which illustrates a preferred embodiment of the invention. It is not intended to limit the subject invention to the particular process or materials described.

DESCRIPTION OF THE INVENTION

In the subject process, a raw fuel gas stream, substantially comprising $H_2$, $CO$, $CO_2$, $H_2O$, entrained particulate matter comprising particulate carbon and ash; and at least one material from the group $N_2$, $Ar$, $COS$, $CH_4$, $NH_3$, $HCN$, $HCOOH$, and slag is produced by partial oxidation of a liquid and/or gaseous hydrocarbonaceous fuel including an aqueous slurry of solid carbonaceous fuel with a free-oxygen containing gas, typically in the presence of a temperature moderator, in the reaction zone of an unpacked, vertical, free-flow noncatalytic partial oxidation gas generator. The $H_2O$-to-fuel weight ratio in the reaction zone is in the range of about 0.1 to 5, and preferably about 0.2 to 0.7. The atomic ratio of free oxygen to carbon in the fuel (O/C ratio), is in the range of about 0.6 to 1.6, and preferably about 0.8 to 1.4. The reaction time is in the range of about 0.1 to 50 seconds, such as about 2 to 6 seconds.

The raw fuel gas generator comprises a vertical cylindrically shaped steel pressure vessel lined with refractory, such as shown in coassigned U.S. Pat. No. 2,809,104, which is incorporated herein by reference. A typical quench drum is also shown in said patent. A burner, such as shown in coassigned U.S. Pat. No. 2,928,460, which is incorporated herein by reference may be used to introduce the feed streams into the reaction zone.

A wide range of combustible liquid and/or gaseous hydrocarbonaceous fuels or aqueous slurries of solid carbonaceous fuel may be reacted in the gas generator with a free-oxygen containing gas, in the presence of a temperature moderating gas, to produce the synthesis gas.

The term liquid hydrocarbonaceous fuel as used herein to describe various suitable feedstocks is intended to include pumpable liquid hydrocarbon materials and pumpable liquid slurries of solid carbonaceous materials, and mixtures thereof. For example, pumpable aqueous slurries of solid carbonaceous fuels are suitable feedstocks. In fact, substantially any combustible carbon-containing liquid organic material, or slurries thereof may be included within the definition of the term "liquid hydrocarbonaceous." For example, there are:

(1) pumpable slurries of solid carbonaceous fuels, such as coal, particulate carbon, petroleum coke, concentrated sewer sludge, and mixtures thereof, in a vaporizable liquid carrier, such as water, liquid $CO_2$, liquid hydrocarbon fuel, and mixtures thereof;

(2) suitable liquid hydrocarbon fuel feedstocks to the gasifier, is intended to include various materials, such as liquefied petroleum gas, petroleum distillates and residua, gasoline, naphtha, kerosine, crude petroleum, asphalt, gas oil, residual oil, tar sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof;

(3) also included within the definition of the term liquid hydrocarbonaceous are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

Gaseous hydrocarbonaceous fuels that may be burned in the partial oxidation gasifier alone or along with the liquid hydrocarbonaceous fuel includes vaporized liquid natural gas, refinery off-gas, $C_1$-$C_4$ hydrocarbonaceous gases, and waste carbon-containing gases from chemical processes.

The liquid hydrocarbonaceous feed may be at room temperature, or it may be preheated to a temperature up to as high as about 600° F. to 1200° F. but preferably below its cracking temperature. The liquid hydrocarbonaceous feed may be introduced into the gas-generator burner in liquid phase or in a vaporized mixture with the temperature moderator.

The need for a temperature moderator to control the temperature in the reaction zone of the gas generator depends in general on the carbon-to-hydrogen ratios of the feedstock and the oxygen content of the oxidant stream. A temperature moderator is used with liquid hydrocarbon fuels with substantially pure oxygen. Water or steam is the preferred temperature moderator. Steam may be introduced as a temperature moderator in admixture with either or both reactant streams. Alternatively, the temperature moderator may be introduced into the reaction zone of the gas generator by way of a separate conduit in the burner. Other temperature moderators include $CO_2$-rich gas, nitrogen, and recycled synthesis gas.

The term free-oxygen containing gas as used herein means air, oxygen-enriched air i.e. greater than 21 mole % $O_2$, and substantially pure oxygen, i.e. greater than about 95% mole oxygen (the remainder usually comprising $N_2$ and rare gases). Free-oxygen containing gas may be introduced by way of the partial-oxidation burner at a temperature in the range of about ambient to 900° F.

The raw fuel gas stream exits from the reaction zone at a temperature in the range of about 1700° F. to 3500° F., and preferably 2000° F. to 2800° F., and at a pressure in the range of about 500 to 2500 psia, and preferably 700 to 1500 psia. The composition of the hot-raw effluent gas stream is about as follows, in mole percent: $H_2$ 10 to 70, CO 15 to 57, $CO_2$ 0.1 to 25, $H_2O$ 0.1 to 20, $CH_4$ nil to 60, $NH_3$ nil to 5, $H_2S$ nil to 5, COS nil to 0.1, $N_2$ nil to 60, Ar nil to 2.0, HCN and HCOOH nil to 100 parts per million (weight basis). Particulate carbon is present in the range of about nil to 20 weight % (basis carbon content in the original feed). Ash and/or molten slag may be present respectively in the amounts of about nil to 5.0 and nil to 60 weight % of the original liquid hydrocarbonaceous or solid carbonaceous fuel feed.

In a preferred embodiment of the subject process all of the hot raw effluent fuel gas stream leaving the refractory lined reaction zone of the partial oxidation gas generator at substantially the same temperature and pressure as in the reaction zone, less ordinary drop in the lines is directly introduced into a pool of water contained in the bottom of a quench drum or tank such as the one described in coassigned U.S. Pat. No. 2,896,927 which is herewith incorporated by reference. The subject process is unique in that a high pressure quench gasification configuration is used to minimize investment and maintenance costs and to maximize the quenched gas temperature. If heat were removed from the gasifier exit gas prior to quenching or if the gasifier were operated at low pressure, the quenched gas would be at too low a temperature to produce the intermediate pressure steam required for efficient integration into the steam cycle.

The quench drum is located below the reaction zone of the gas generator, and the stream of raw fuel gas which it receives carries with it substantially all of the ash and/or slag and the particulate carbon soot leaving the reaction zone of the gas generator. The turbulent condition in the quench drum, caused by large volumes of gases bubbling up through the water helps the water to scrub much of the solids from the effluent gas. Large quantities of steam are generated within the quench vessel and saturate the gas stream. The stream of raw gas is cooled in the quench drum and leaves at a temperature in the range of about 350° F. to 600° F., such as about 450° F. to 550° F. and a pressure in the range of about 500 to 2500 psia, such as about 700 to 1500 psia. Advantageously, the fresh quench water used in the subject invention is a mixture of make-up water and condensate produced subsequently in the process. The expression "and/or" is used herein in its ordinary way. For example, A and/or B means either A or B or A+B.

In order to prevent the plugging of downstream catalyst beds and/or the contaminating of liquid-solvent absorbents that may be used in subsequent gas purification steps, the cooled and partially cleaned fuel gas stream leaving the quench drum is further cleaned by contact with hot scrubbing water in another gas cleaning zone. This gas cleaning zone may include a conventional orifice such as shown and described in coassigned U.S. Pat. No. 3,524,630 which is incorporated herein by reference and conventional venturi scrubbers and sprays, along with a gas scrubbing chamber such as shown and described in coassigned U.S. Pat. No. 3,232,727, which is incorporated herein by reference. In the gas scrubbing chamber, the stream of raw fuel gas is scrubbed with scrubbing water comprising hot return condensate and make-up water as described herein. For example, in one embodiment the gas stream leaving the quench tank associated with the gasifier is scrubbed and intimately contacted with scrubbing water e.g. in a venturi scrubber. However, the use of a venturi scrubber in the gas cleaning zone is optional. The fuel gas passes into and up through a pool of gas scrubbing water contained in the bottom of a gas scrubbing chamber. The scrubbed gas is then passed up through a packed section or trays in the upper portion of the scrubbing chamber where it is contacted by condensate i.e. scrubbing water flowing in a downward direction. Scrubbing water in the bottom of the gas scrubbing chamber may be recycled to a venturi scrubber, if there is one, and/or to the quench tank associated with the gasifier.

By the gas cleaning procedure used in the subject process, the amount of solid particles in the scrubbed fuel gas stream is reduced to very low level such as less than about 3 parts per million (ppm), and preferably less than about 1 ppm. The subject process is unique by maximizing the scrubbing water temperature to a value in the range of about 375° F. to 550° F., such as about 400° F. to 450° F. by using direct contact of the scrubbing water with the process fuel gas just downstream of the nominal production of steam having an intermediate pressure in the range of about 275 to 600 psia, such as about 300 to 400 psia and a temperature in the range of about 410° F. to 486° F., such as about 418° F. to 445° F. In the scrubbing water heater, the quenched saturated fuel gas is reduced to a temperature in the range of about 410° F. to 550° F., such as about 420° F. to 470° F. Any conventional gas-liquid direct contacting chamber may be used as the scrubbing water heater including conventional columns with trays and packing. Direct contact minimizes the temperature approach between the water and the gas, thereby maximizing heating. Heat input into the scrubbing water will increase the heat in the scrubber overhead gas and thereby increase the production of intermediate pressure steam. The intermediate pressure steam (IPS) is produced in a conventional heat exchanger by indirect heat exchange between boiler feed water (BFW) and quenched hot saturated fuel gas. The IPS heat exchanger may be located after the quench pool and before the raw fuel gas scrubbing zone. Alternatively, the IPS heat exchanger may be located after the scrubbing zone, as shown in the drawing.

In one embodiment, the fuel gas leaving from the scrubbing water heater is passed through a heat exchanger where by indirect heat exchange with boiler feed water, steam having a medium pressure in the range of about 100 to 275 psia, such as about 150 to 250 psia and a temperature in the range of about 325° F. to 410° F., such as about 358° F. to 401° F. The fuel gas leaves the medium pressure heat exchanger at a temperature in the range of about 300° F. to 500° F., such as about 360° F. to 430° F. and enters a knock-out vessel for separating condensate from the fuel gas.

In the next step of the process, the pressure of the fuel gas is reduced in a pressure reduction zone in the amount of about 100 to 2300 psia, such as about 200 to 1200 psia. The pressure is reduced to conform with the operating pressure of the combustion turbine located downstream. Further, steam is thereby generated at lower pressures prior to acid gas removal. The subject process is unique in that the output of the pressure reduction means is increased by locating it in the process stream prior to full cooling of the fuel gas. At this location, substantial water remains in the fuel gas which adds mass and power output to the expansion cycle. The location of the pressure reduction means is optimized for efficiency. In one embodiment, the pressure reduction means comprises a pressure reduction valve that may or may not be in series with an orifice. In another embodiment, the pressure reducing zone comprises an indirect heat exchanger (fuel gas heater) and an expansion turbine to reduce the line pressure of the fuel gas while producing power. Hot water produced in a downstream heat recovery steam generator (HRSG) by heat exchange between exhaust gas from a combustion turbine and water is used to heat the process fuel gas stream to a temperature to obtain a temperature in the range of greater than 10° F. to 100° F. above the dew point after expansion of the fuel gas in the expansion turbine.

The temperature of expanded process fuel gas stream is in the range of about 250° F. to 800° F., such as about 300° F. to 450° F. and must be reduced to a temperature in the range of about 40° F. to 140° F., such as about 100° F. to 120° F., prior to being introduced into an acid gas recovery zone to remove any $H_2S$ and COS. In the subject process multiple heat exchangers are used to reduce the temperature of the process fuel gas stream and to recovery low level heat for fuel and nitrogen saturation. Since nitrogen as well as water is used to reduce the BTU/SCF of the fuel to the combustion turbine, located downstream, the level of saturation of the fuel to control $NO_x$ and to boost the gas turbine output is greatly reduced. This allows the bottom temperature of the saturators to be low enough to be heated using low level (i.e. low temperature) heat. The low level heat recovery section comprises from about 2 to 7, such as 5 indirect heat exchangers in series through which the process gas stream flows and is thereby cooled. A knock-out vessel for separating condensed water is located after each or at least the final heat exchanger. The condensed water which is collected in these knock-out vessels is pumped into the previously described scrubbing water heater. The coolant for at least one of the heat exchangers is circulating water at a temperature in the range of about 80° F. to 300° F., such as about 100° F. to 200° F. The circulating water is heated by indirect heat exchange with the fuel gas in a heat exchanger. The resulting hot water, at a temperature in the range of about 225° F. to 400° F., such as about 275° F. to 370° F. is then introduced into the nitrogen saturator and also into the fuel gas saturator. Both saturators are at a pressure in the range of about 100 to 1000 psia, such as about 150 to 500 psia. Boiler feed water, at a temperature in the range of about 75° F. to 250° F. is the coolant for at least one of the indirect heat exchangers. By this means low pressure process steam having a pressure in the range of about 5 to 150 psia, such as about 30 to 50 psia may be produced in one indirect heat exchanger. In one embodiment, steam condensate from the steam turbine located downstream may be reheated to a temperature in the range of about 90° F. to 350° F., such as about 100° F. to 250° F. in one indirect heat exchanger, recycled to the HRSG for additional heating to a temperature in the range of about 700° F. to 1800° F., such as about 800° F. to 1200° F., and a pressure in the range of about 600 to 3000 psia, such as about 1300 to 1700 psia, and introduced into a multistage expansion turbine as the working fluid in one of the stages. By the aforesaid multiple heat exchangers, the temperature of the process fuel gas stream after expansion may be reduced in the following steps: (1) 200° F. to 400° F., (2) 200° F. to 320° F., (3) 100° F. to 300° F., (4) 100° F. to 200° F., and (5) 80° F. to 120° F. Thus, in the subject process, low level heat from process cooling is efficiently used in a multiplicity of heat exchangers which provide the heat for (1) saturating the fuel gas and $N_2$, (2) generating low pressure steam required in the process areas such as Acid Gas Recovery (AGR) and the Sulfur Recovery Unit (SRU), and (3) for reheating cold steam condensate.

The process fuel gas stream may be purified by any suitable conventional system, for example in an acid gas recovery zone employing physical or chemical absorption with a liquid solvent e.g. cold methanol, N-methylpyrrolidone, dimethyl ether of polyethylene glycol, and inhibited or uninhibited amine. Acid gases, e.g. $CO_2$, $H_2S$ and COS are highly soluble in methanol at high pressures and low temperature. When the pressure is reduced and the temperature of the rich solvent raised, these gases may be readily stripped from the solvent. The $H_2S$ and COS may be concentrated into a fraction suitable for feeding a conventional Claus unit i.e. Sulfur Recovery Unit (SRU) where elemental sulfur is produced. See Kirk-Othmer Encyclopedia of Chemical Technology, Second Edition Vol. 19, John Wiley, 1969, Page 353. Reference is made to coassigned U.S. Pat. No. 4,052,176. These references are incorporated herein by reference.

A conventional air separation unit (ASU) is used to separate air into separate streams of substantially pure oxygen gas and nitrogen gas. A portion or all of the nitrogen gas is saturated with water, superheated to a temperature in the range of about 350° F. to 1000° F., such as about 500° F. to 600° F., using energy from boiler feed water, and introduced into the combustor of a gas turbine along with the stream of fuel gas that was saturated and then superheated to a similar temperature. The saturated fuel gas and saturated nitrogen gas are superheated prior to combustion to reduce any possibility of turbine blade erosion by liquid carryover. Each stream of nitrogen gas and fuel gas entering the combustor contains about 1 to 50 volume %, such as about 5 to 30 volume % $H_2O$. By saturating the nitrogen gas, the quantity of nitrogen gas required for $NO_x$ reduction is reduced and the efficiency is increased for using low level heat.

The stream of oxygen gas from the ASU at a temperature in the range of about ambient to 900° F. is introduced into the reaction zone of the partial oxidation gas generator by way of one passage in an annulus-type burner. In one embodiment, the stream of oxygen gas is first saturated with water to produce a stream of oxygen gas having a temperature in the range of about 120° F. to 500° F., such as about 150° F. to 350° F. and containing about 1 to 50% $H_2O$, such as about 5 to 35 volume % $H_2O$. Advantageously, in the subject process when oxygen saturation using low level heat is used, it will increase the efficiency of the process by increasing the amount of intermediate pressure steam produced. In cases where the gasification requires steam temperature moderation, the steam in the oxygen from saturation will displace this higher pressure steam thereby increasing the efficiency even further by allowing said displaced higher pressure steam to generate power in the high pressure section of the steam power cycle.

Air is compressed by means of a turbocompressor that is driven by a coaxial expansion turbine which along with the combustor are the principal parts of the gas turbine. The compressed air enters the combustor at a temperature in the range of about 400° F. to 850° F. and at substantially the same pressure as the saturated fuel gas and saturated nitrogen gas. The exhaust gas leaves the combustor at a temperature in the range of about 1400° F. to 3000° F. and usually about 2300° F. to 2400° F., and at a pressure in the range of about 100 to 1000 psia or higher and preferably 150 to 500 psia or higher. The exhaust gas has the following typical analysis in mole percent: $CO_2$ 4–20, $H_2O$ 4–20, $N_2$ 75–80, and $O_2$ 0–20. Due to the introduction of saturated $N_2$ and saturated fuel gas, the concentration of oxides of nitrogen ($NO_x$) in the exhaust gas is substantially nil, below 50 ppm (vol) on dry 2% $O_2$ basis. Electricity is produced by a coaxial electric generator drive by said expansion turbine.

The hot exhaust gas leaving the expansion turbine portion of the gas turbine at a temperature in the range of about 800° F. to 1500° F. and a pressure in the range of about 10 to 20 psia is passed through a conventional heat recovery steam generator (HRSG) prior to being discharged to the atmosphere by way of a stack at a temperature in the range of about 150° F. to 450° F. Steam for operating a conventional steam turbine comprising a high pressure expansion turbine in tandem with a coaxial intermediate expansion turbine, and steam for process needs, is produced in the HRSG. For example, superheated high pressure steam from the HRSG having a temperature in the range of about 700° F. to 1800° F., such as about 800° F. to 1200° F., and a pressure in the range of about 600 to 3000 psia, such as about 1300 to 1700 psia is introduced into a high pressure expansion turbine (HPT). Intermediate pressure exhaust steam having a temperature in the range of about 400° F. to 1200° F., such as about 500° F. to 900° F., and a pressure in the range of about 200 to 800 psia, such as about 300 to 500 psia leaves the HPT and is combined with intermediate pressure steam from the fuel gas cooling system. The mixture is superheated in the HRSG, and introduced into the intermediate pressure expansion turbine (IPT) at a temperature in the range of about 700° F. to 1800° F., such as about 800° F. to 1200° F. and a pressure in the range of about 200 to 600 psia, such as about 290 to 390 psia. If produced, a stream of medium pressure steam from the fuel gas cooling system may be superheated in the HRSG to a temperature in the range of about 600° F. to 1500° F., such as about 700° F. to 1000° F. and a pressure in the range of about 100 to 275 psia, such as about 140 to 200 psia, and passed through one stage of the intermediate pressure expansion turbine.

Exhaust steam from the intermediate expansion turbine is cooled, condensed, reheated to a temperature in the range of about 90° F. to 350° F., such as about 100° F. to 250° F. in a heat exchanger in the fuel gas cooling system, and pumped to a pressure in the range of about 5 to 150 psia, such as about 12 to 75 psia, and recycled to the HRSG for conversion into superheated high pressure steam, intermediate pressure steam, and low pressure steam by indirect heat exchange with the gas turbine exhaust gas passing therethrough. The coaxial high pressure and intermediate pressure expansion turbines drive an electric generator for the production of electricity.

Advantageously, by the subject process the steam cycle is optimized in a manner which reduces the second stage turbine inlet pressure to a level which allows the use of the highest quantity of process generated steam, i.e. intermediate pressure steam in the range of about 275 to 600 psia, directly in the reheat cycle. In fact, this pressure is reduced as far as possible without significantly reducing the steam cycle efficiency so that the amount of process steam generated for use in the reheat cycle is maximized.

DESCRIPTION OF THE DRAWING

A more complete understanding of the invention may be had by reference to the accompanying schematic drawing which shows the previously described process in detail. Although the drawing illustrates a preferred embodiment of the process of this invention, it is not intended to limit the continuous process illustrated to the particular apparatus or materials described.

With reference to the drawing, free-flow noncatalytic refractory lined fuel gas generator 1 as previously described is equipped with axially aligned upstream flanged inlet port 2 and downstream flanged exit port 3. Annulus type burner 4, as previously described, with center passage 5 in alignment with the axis of gas generator 1 is mounted in inlet port 2. A concentric coaxial annulus passage 6 is also provided.

A pumpable aqueous slurry of coal in line 7 is introduced by way of annular passage 6 of burner 4. A stream of free-oxygen containing gas in line 8 is introduced by way of central passage 5. The two feedstreams impact together, atomize, and react by partial oxidation in reaction zone 9 of gas generator 1. The hot stream of raw fuel gas comprising $H_2$, $CO$, $CO_2$, $H_2O$, $N_2$, A, $H_2S$, and $COS$ passes down through dip tube 10 and is quench cooled in a pool of water contained in quench tank 15 located at the bottom of gas generator 1. Slag and particulate matter are periodically removed by way of exit port 3, line 16, valve 17, line 18, lockhopper 19, line 20, valve 21, and line 22.

The quenched raw fuel gas is passed through line 23 into gas scrubbing column 24 where it is scrubbed clean of entrained soot and particulate matter by hot scrubbing water from line 25. By means of pump 26, water from the bottom of scrubbing column 24 is pumped through lines 27 and 28 and into quench tank 15. The clean raw fuel gas leaving gas scrubbing column 24 through line 29 is cooled in heat exchanger 30 by indirect i.e. noncontact heat exchange with boiler feed water (BFW). The BFW enters through line 31 and leaves through line 32 as steam having an intermediate pressure in the range of about 275 to 600 psia, such as about 300 to 400 psia. The stream of hot raw fuel gas in line 33 enters scrubbing water heater 37 where it comes into direct contact and direct heat exchange with a mixture of condensate and make-up water from line 39, pump 54, line 58, and circulating water storage tank 41. Make-up water is introduced into the system through line 40 and storage tank 41. Purge water to prevent impurities from building up in the system is periodically removed through line 36. Condensate from the bottom of knock-out vessels located in the low pressure heating section of the process, pass into condensate storage tank 41. Hot scrubbing water is thereby produced in heater 37 while simultaneously the fuel gas stream is cooled and given a final cleaning. By means of pump 43, the hot scrubbing water at the bottom of heater 37 is pumped through lines 44, 48, and 25 into gas scrubbing column 24.

With valve 45 in line 46 closed and valve 47 in line 50 open, the clean raw fuel gas leaving scrubbing water heater 37 is passed through lines 49, 50, and 51 into knock-out vessel 53. Condensate from the bottom of knock-out pot 53 is pumped by means of pump 43 through lines 55, 48 and 25 into gas scrubbing column 24.

In one embodiment, with valve 47 closed and valve 45 open, the clean fuel gas in line 46 is passed through line 57 and heat exchanger 60. BFW enters heat exchanger 60 through line 61 and leaves through line 62 as steam having a medium pressure in the range of about 100 to 275 psia, such as about 150 to 200 psia. The cooled fuel gas leaves through line 52 and enters knock-out pot 53.

With valve 64 in line 65 closed and pressure reducing valve 66 in line 67 open, the fuel gas in line 68 is passed through lines 67, 69, optionally orifice 70, lines 71 and 72 and heat exchanger 73. By this means, the pressure of the fuel gas downstream from valve 66 and/or orifice 70 may be reduced to a level suitable for subsequently burning purified saturated fuel gas in combustor 75 of a gas turbine located downstream and comprising combustor 75 and expansion turbine 76. Air compressor 77 for compressing air from line 78 is located on the same axis 79 as expansion turbine 76. Electric generator 80 is driven by axis 81 that extends from axle 79.

Alternatively, the downstream pressure of the fuel gas may be reduced by means of an expansion turbine 88. In such case, with valve 66 closed and valve 64 open, the fuel gas in line 65 is passed through line 85, heater 86, line 87, and expansion turbine 88.

Additional low level heat is removed from the fuel gas stream in line 72 by passing the fuel gas through a plurality i.e. 2 to 7, such as 5, indirect heat exchangers in series. The temperature of the fuel gas is thereby reduced in a stepwise manner. A knock-out vessel follows each or at least the last heat exchanger in order to separate the condensate which forms in the fuel gas as it is cooled below the dew point. The fuel gas can hold progressively less water as it passes successively through each gas cooler thereby progressively reducing its temperature. BFW or a circulating water stream may be the coolant. For example, the fuel gas in line 72 passes in series through heat exchanger 73, line 92, knock-out vessel 93, line 94, heat exchanger 95, line 96, knock-out vessel 97, line 98, heat exchanger 99, line 100, knock-out vessel 101, line 102, steam condensate heater 103, line 104, knock-out vessel 105, line 106, heat exchanger 107, line 108, knock-out vessel 109, and line 110. The temperature of the fuel gas in line 110 is suitable for the fuel gas being processed in the conventional acid gas removal (AGR) step which takes place in 111. Off-gas i.e. $H_2S$ and COS pass through line 112 into sulfur recovery unit 113. Sulfur is recovered and exported through line 114. Purified fuel gas in line 115 is passed into saturator 116. Condensate from the bottom of knock-out vessels 93, 97, 101, 105, and 109 pass respectfully through lines 122, 123, 124, 125, and 126, and also through lines 127, 128, 129, 130, 131, and into condensate storage tank 41.

Fuel gas passing through exchangers 73 and 99 is cooled by a circulating water loop. Starting with pump 135, the cold water is pumped through lines 136, 137, heat exchanger 99, line 138, heat exchanger 73, lines 139, 140, saturator 116 and lines 142 and 143. A stream of fuel gas saturated with water is passed through line 144, heat exchanger 145 where it is superheated, and line 146 into combustor 75 of the gas turbine. The heated cold water in line 139 is split and a portion is passed through lines 131 into 132 and nitrogen gas saturator 133. By means of pump 149, the cold water at the bottom of saturator 133; is passed through lines 150, 151, 152, and 137 into heat exchanger 99. Make-up water is introduced into the circulating water system through line 153.

Air in line 155 is separated in a conventional air separation unit (ASU) 156 into a nitrogen vent stream in line 154, a nitrogen gas stream in line 157, and a stream of oxygen gas in line 160. The stream of nitrogen gas in line 157 is saturated with water in saturator 133. The saturated nitrogen stream is passed through line 158, superheated in indirect heat exchanger 159, and introduced into combustor 75 of the gas turbine by way of line 174. The stream of substantially pure oxygen gas leaves ASU 156 through line 160. With valve 161 in line 162 closed and valve 163 in line 164 open, the stream of oxygen is passed through line 165 and 8 into central passage 5 of burner 4. Alternatively, the stream of oxygen in line 160 may be saturated with water before it is introduced into gas generator 1. In such case, valve 163 is closed and valve 161 is opened. The oxygen gas stream is passed through lines 162 and 166 into oxygen gas saturator 167. The stream of oxygen gas saturated with water is then passed through lines 168 and 8 into central passage 5 of burner 4. Boiler feed water make-up in line 169 is passed through line 170, heated against circulating water 139 in indirect heat exchanger 171, and passed into oxygen gas saturator 167 by way of line 172. By means of pump 173, BFW is recycled to saturator 167 through lines 174, 170, and 172.

Advantageously, one embodiment of the subject process includes a steam cycle for the production of power. Energy is thereby extracted from the hot exhaust gas leaving expansion turbine 76 by way of line 180 and passing through heat recovery steam generator (HRSG) 181. For example, steam leaving heat exchanger 30 by way of line 32 having an intermediate pressure (IP) in the range of about 275 to 600 psia, such as about 300 to 400 psia is mixed with IP exhaust steam from high pressure turbine 211. The IP steam mixture is passed through line 182 into HRSG 181 and superheated to a temperature in the range of 700° F. to 1800° F. such as about 800° F. to 1200° F. by being passed in indirect heat exchange with the hot exhaust gas from line 180. The superheated IP steam is passed through line 189 into IP expansion turbine as at least a portion of the working fluid. The cooled exhaust gas leaving HRSG 181 may pass through stack 183. High pressure steam which is produced in the HRSG from preheated steam condensate is passed through line 184 into high pressure expansion turbine 185 as the working fluid.

In one embodiment, additional medium pressure steam in line 62 from indirect heat exchanger 60 and having a medium pressure in the range of about 100 to 275 psia, such as about 150 to 200 psia is passed through line 186 into HRSG 181 and superheated to a temperature in the range of about 600° F. to 1500° F., such as about 700° F. to 1000° F., by being passed in indirect heat exchange with the hot exhaust gas from line 180. The medium pressure steam is passed through line 187 into another stage in expansion turbine 185 as the working fluid.

Coaxial expansion turbines 211 and 185 drive electric generator 195 by way of axis 196. Exhaust steam in line 197 is cooled and condensed in cooler 198 by heat exchange with cold water which enters from line 199 and leaves by line 200. Condensed boiler feed water in line 201 is preheated in heat exchanger 103 by indirect heat exchange with the raw fuel gas from line 102. In one embodiment, the preheated boiler feed water in line 202 is heated by successive passes through HRSG 181 with lower pressure steam separated in intervening dewatering steps to produce high pressure steam having a temperature in the range of about 700° F. to 1800° F., such as about 800° F. to 1200° F. and a pressure in the range of about 600 to 3000 psia, such as about 1300 to 1700 psia. In such case, the high pressure steam is superheated in HRSG 181 and passed through line 184 into expansion turbine 211 as the working fluid. HP expansion turbine 211 is coupled to IP expansion turbine 185 by common axis 213.

Although modifications and variations of the invention may be made without departing from the spirit and scope thereof, only such limitations should be imposed as are indicated in the appended claims.

We claim:

1. A partial oxidation process comprising:
   (1) reacting a hydrocarbonaceous fuel with a free-oxygen containing gas in a partial oxidation reaction zone to produce a stream of fuel gas, cooling said fuel gas by quenching in water to produce a stream of quenched saturated fuel gas having a temperature in the range of about 350° F. to 600° F. and a pressure in the range of about 500 to 2500 psia, cooling said quenched saturated fuel gas by indirect heat exchange with boiler feed water thereby reducing the temperature of said quenched fuel gas to a temperature in the range of about 410° F. to 550° F. while simultaneously converting said boiler feed water to steam having an intermediate pressure in the range of about 275 to 600 psia, and cleaning said quenched saturated fuel gas with preheated scrubbing water from (2);
   (2) preheating scrubbing water comprising process condensate and make-up water to a temperature in the range of about 375° F. to 550° F. by direct heat exchange in a gas-water direct contacting means with cooled quenched saturated fuel gas leaving (1) thereby reducing the temperature of said cooled quenched saturated fuel gas to a temperature in the range of about 300° F. to 540° F., and separating condensed water from said cooled fuel gas;

(3) reducing the pressure of said cooled fuel gas from (2) in the amount of about 100 to 2300 psia, further cooling said fuel gas to a temperature in the range of about 40° F. to 140° F. by indirect heat exchange with cool water thereby condensing out water from said cooled fuel gas stream while heating said cool water to produce heated water having a temperature in the range of about 225° F. to 400° F., and introducing the water condensed out in (2) and (3) into said gas-water direct contacting means in (2) where it is heated for use as gas scrubbing water;

(4) purifying the cooled fuel gas stream from (3);

(5) saturating a stream of nitrogen gas and the stream of purified fuel gas from (4) with said heated water from (3);

(6) superheating the saturated streams of fuel gas and nitrogen gas from (5) to a temperature in the range of about 350° F. to 1000° F.; and introducing said superheated fuel gas and nitrogen gas streams into the combustor of a gas turbine;

(7) burning said saturated fuel gas with a free-oxygen containing gas in said combustor at a temperature in the range of about 2200° F. to 2600° F. and a pressure in the range of about 100 to 1000 psia in the gas turbine to produce an exhaust gas with a reduced amount of $NO_x$; and (8) passing said exhaust gas through an expansion turbine for the production of power with an increased output.

2. The process of claim 1 wherein at least a portion of the scrubbing water from said gas scrubbing zone is introduced into said gas quenching zone.

3. The process of claim 1 provided with the step of saturating said free-oxygen containing gas with water prior to introducing said free-oxygen containing gas into said partial oxidation reaction zone.

4. The process of claim 1 provided with the step of separating air in a conventional air separation unit into a stream of oxygen gas and a stream of nitrogen gas, introducing said oxygen gas stream into said partial oxidation reaction zone as said free-oxygen containing gas, and saturating said stream of nitrogen gas for use in (5).

5. The process of claim 1 provided with the step of passing said exhaust gas from (8) through a heat recovery steam generator in indirect heat exchange with said intermediate pressure steam from (1) thereby superheating said intermediate pressure steam, and passing said superheated intermediate pressure steam through an expansion turbine as at least a portion of the working fluid.

6. The process of claim 1 provided with the step of cleaning the stream of quenched saturated fuel gas simultaneously with preheating said scrubbing water in (2).

7. The process of claim 1 where in (3), the pressure of said cooled fuel gas is reduced by a pressure reducing means.

8. The process of claim 7 wherein said pressure reducing means is selected from the group consisting of a valve, orifice, and expansion turbine.

9. The process of claim 1 where in (3) said fuel gas is cooled stepwise in a plurality of indirect heat exchangers.

10. The process of claim 9 wherein the coolant for said heat exchangers is circulating water and/or boiler feed water.

11. The process of claim 1 wherein said hydrocarbonaceous fuel is selected from the group consisting of liquid and/or gaseous hydrocarbonaceous fuels and a pumpable slurry of solid carbonaceous fuel.

12. The process of claim 11 wherein said pumpable slurry of solid carbonaceous fuel is selected from the group consisting of coal, particulate carbon, petroleum coke, concentrated sewer sludge, and mixtures thereof, in a vaporizable liquid carrier selected from the group consisting of water, liquid $CO_2$, liquid hydrocarbon fuel, and mixtures thereof.

13. The process of claim 11 wherein said liquid hydrocarbonaceous fuel is selected from the group consisting of liquefied petroleum gas, petroleum distillates and residua, gasoline, naphtha, kerosine, crude petroleum, asphalt, gas oil, residual oil, tar sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof.

14. The process of claim 11 wherein said gaseous hydrocarbonaceous fuel is selected from the group consisting of vaporized liquid natural gas, refinery off-gas, $C_1$-$C_4$ hydrocarbonaceous gases, and waste carbon-containing gases from chemical processes.

15. A partial oxidation process for the production of power comprising:

(1) reacting a hydrocarbonaceous fuel with a free-oxygen containing gas by partial oxidation to produce a stream of fuel gas, cooling said fuel gas by quenching in water to produce a stream of quenched saturated fuel gas having a temperature in the range of about 350° F. to 600° F. and a pressure in the range of about 500 to 2500 psia, cooling said quenched saturated fuel gas by indirect heat exchange with boiler feed water thereby reducing the temperature of said quenched fuel gas to a temperature in the range of about 410° F. to 550° F. while simultaneously converting said boiler feed water to steam having an intermediate pressure in the range of about 275 to 600 psia, and cleaning said quenched saturated fuel gas with preheated scrubbing water from (2) either before or after said cooling;

(2) preheating scrubbing water comprising process condensate and make-up water to a temperature in the range of about 375° F. to 550° F. by direct heat exchange in a gas-water direct contacting means with cooled quenched saturated fuel gas leaving (1) thereby reducing the temperature of said cooled quenched saturated fuel gas to a temperature in the range of about 300° F. to 540° F., and separating condensed water from said cooled fuel gas;

(3) reducing the temperature of the saturated fuel gas from (2) to a temperature in the range of about 300° F. to 500° F. by indirect heat exchange with boiler feed water thereby producing steam having a medium pressure in the range of about 100 to 275 psia, and separating condensed water from said cooled fuel gas stream;

(4) heating the cooled fuel gas stream from (3) to a temperature to obtain a temperature in the range of greater than 10° F. to 100° F. above the dew point after expansion step (5);

(5) reducing the pressure of the stream of fuel gas from (4) in the amount of about 100 to 2300 psia by means of an expansion turbine;

(6) cooling the stream of fuel gas from (5) to a temperature in the range of about 40° F. to 140° F. by indirect heat exchange with cool water, thereby condensing out water from the cooled fuel gas stream while heating said cool water to produce heated water having a temperature in the range of about 225° F. to 400° F., and introducing said condensed water and the water condensed out in (2) and (3) into said gas-water direct contacting means in (2) where it is heated for use as gas scrubbing water;

(7) purifying the cooled fuel gas stream from (6);

(8) saturating a stream of nitrogen gas and a stream of purified fuel gas from (7) with said heated water from (6);

(9) superheating the saturated streams of fuel gas and nitrogen gas from (8) to a temperature in the range of about 350° F. to 1000° F.; and introducing said superheated fuel gas and nitrogen gas streams into the combustor of a gas turbine;

(10) burning said saturated fuel gas with a free-oxygen containing gas in said combustor at a temperature in the range of about 2200° F. to 2600° F. and a pressure in the range of about 100 to 1000 psia in the gas turbine to produce an exhaust gas with a reduced amount of $NO_x$; and

(11) passing said exhaust gas through an expansion turbine for the production of power with an increased output.

16. The process of claim 15 provided with the step of saturating said free-oxygen containing gas with water prior to introducing said free-oxygen containing gas into said partial oxidation reaction zone.

17. The process of claim 15 provided with the step of separating air in a conventional air separation unit into a stream of oxygen gas and a stream of nitrogen gas, introducing said oxygen gas stream into said partial oxidation reaction zone as said free-oxygen containing gas, and saturating said stream of nitrogen gas for use in (8).

18. The process of claim 15 provided with the step of passing said exhaust gas from (11) through a heat recovery steam generator in indirect heat exchange with said intermediate pressure steam from (1) thereby superheating said intermediate pressure steam, and passing said superheated intermediate pressure steam through an expansion turbine as at least a portion of the working fluid.

19. The process of claim 15 provided with the steps of reheating steam condensate from an intermediate pressure expansion turbine by indirect heat exchange with the stream of fuel gas in (6); heating, dewatering, and superheating the reheated steam condensate to produce high pressure steam; expanding said high pressure steam in a turbine to produce mechanical power and intermediate pressure steam; superheating said intermediate pressure steam; expanding said superheated intermediate pressure steam in an intermediate turbine to produce mechanical power, and condensing the exhaust steam from said intermediate turbine.

* * * * *